United States Patent
Hamada et al.

(10) Patent No.: US 9,367,900 B2
(45) Date of Patent: Jun. 14, 2016

(54) IMAGE NOISE REMOVING APPARATUS AND IMAGE NOISE REMOVING METHOD

(71) Applicant: Panasonic Intellectual Property Corporation of America, Torrance (CA)

(72) Inventors: Masao Hamada, Fukuoka (JP); Tadanori Tezuka, Fukuoka (JP); Tsuyoshi Nakamura, Fukuoka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 0 days.

(21) Appl. No.: 14/359,961

(22) PCT Filed: Oct. 1, 2013

(86) PCT No.: PCT/JP2013/005844
§ 371 (c)(1),
(2) Date: May 22, 2014

(87) PCT Pub. No.: WO2014/054273
PCT Pub. Date: Apr. 10, 2014

(65) Prior Publication Data
US 2014/0341480 A1 Nov. 20, 2014

(30) Foreign Application Priority Data
Oct. 4, 2012 (JP) ................................. 2012-221988

(51) Int. Cl.
*G06K 9/40* (2006.01)
*G06T 5/00* (2006.01)
(Continued)

(52) U.S. Cl.
CPC . *G06T 5/002* (2013.01); *G06T 5/50* (2013.01); *H04N 5/21* (2013.01); *G06T 2207/20182* (2013.01); *G06T 2207/20221* (2013.01)

(58) Field of Classification Search
None
See application file for complete search history.

(56) References Cited

U.S. PATENT DOCUMENTS 6,259,489 B1 * 7/2001 Flannaghan et al. .......... 348/620
7,199,838 B2 * 4/2007 Lin et al. ...................... 348/607
(Continued)

FOREIGN PATENT DOCUMENTS

JP 02-248173 10/1990
JP 2007-060636 3/2007
(Continued)

OTHER PUBLICATIONS

Lee, et al., "Noise-Adaptive Spatio-Temporal Filter for Real-Time Noise Removal in Low Light Level Images", IEEE Transaction on Consumer Electronics, vol. 51, No. 2, May 2005.*
(Continued)

*Primary Examiner* — Feng Niu
(74) *Attorney, Agent, or Firm* — Wenderoth, Lind & Ponack, L.L.P.

(57) ABSTRACT

An image noise removing apparatus which removes, after removal of noise from a first image, noise included in a second image includes: a spatial noise removing unit executing an operation for removing the noise included in the second image using a pixel value included in the second image, thereby generating a spatial noise-free image; a reliability calculating unit calculating a reliability indicating how dynamic the second image is, based on the spatial noise-free image, the second image, and a first noise-free image which is generated from the first image with the noise therein removed; and a temporal blending unit performing, based on the reliability, a weighted summation on the second image and the first noise-free image, thereby removing the noise included in the second image.

11 Claims, 9 Drawing Sheets

(51) Int. Cl.
*H04N 5/21* (2006.01)
*G06T 5/50* (2006.01)

(56) References Cited

U.S. PATENT DOCUMENTS

| | | | |
|---|---|---|---|
| 7,535,517 B2 * | 5/2009 | Zhou et al. | 348/701 |
| 7,769,089 B1 * | 8/2010 | Chou | 375/240.29 |
| 7,782,403 B2 | 8/2010 | Kubota | |
| 7,792,381 B2 * | 9/2010 | Rhee | 382/260 |
| 8,175,414 B2 * | 5/2012 | Hsu | 382/286 |
| 8,184,705 B2 * | 5/2012 | Lin | 375/240.16 |
| 8,204,336 B2 * | 6/2012 | Nguyen et al. | 382/275 |
| 8,248,491 B2 * | 8/2012 | On | 348/241 |
| 8,269,843 B2 | 9/2012 | Luo et al. | |
| 8,335,391 B2 * | 12/2012 | Watarai | H04N 5/21 382/260 |
| 8,411,993 B2 | 4/2013 | Hamada et al. | |
| 8,427,583 B2 * | 4/2013 | Segall | 348/607 |
| 2005/0105627 A1 * | 5/2005 | Sun et al. | 375/240.29 |
| 2007/0024748 A1 | 2/2007 | Kubota | |
| 2009/0161756 A1 * | 6/2009 | Lin | 375/240.02 |
| 2010/0045870 A1 * | 2/2010 | Chao | 348/607 |
| 2010/0157072 A1 | 6/2010 | Luo et al. | |
| 2010/0188582 A1 * | 7/2010 | Hsu | 348/607 |
| 2011/0235941 A1 | 9/2011 | Hamada et al. | |

FOREIGN PATENT DOCUMENTS

| | | |
|---|---|---|
| JP | 2010-147840 | 7/2010 |
| JP | 2010-147985 | 7/2010 |
| JP | 5328809 | 10/2013 |
| WO | 2010/073488 | 7/2010 |

OTHER PUBLICATIONS

International Search Report issued Jan. 14, 2014 in International (PCT) Application No. PCT/JP2013/005844.

* cited by examiner

IMAGE NOISE REMOVING APPARATUS AND IMAGE NOISE REMOVING METHOD

TECHNICAL FIELD

The present invention relates to an image noise removing apparatus and an image noise removing method.

BACKGROUND ART

Processing to filter out noise of image data (hereinafter also simply referred to as "filtering") includes temporal noise removal filtering and spatial noise removal filtering. In order to switch from one of the above noise removal filtering techniques to the other, Patent Literature (PTL) 1 discloses a technique to select the filtering result from either the temporal noise removal filtering or the spatial noise removal filtering, based on the result of motion estimation.

PTL 2 discloses a technique to output the final filtering result upon determining whether or not to employ the result of the temporal noise removal filtering based on the result of the spatial noise removal filtering.

CITATION LIST

Patent Literature

[PTL 1]
Japanese Unexamined Patent Application Publication No. 02-248173
[PTL 2]
WO/2010/073488

SUMMARY OF INVENTION

Noise removal via the temporal noise removal filtering inevitably produces new noise (for example, residual image or unnaturalness on video). In other words, the temporal noise removal filtering poses a difficulty in having appropriate strength when removing noise from an image.

The present invention implements an image noise removing apparatus to provide an image with temporal noise removal filtering having appropriate strength.

An image noise removing apparatus according to an aspect of the present invention removes, after removal of noise from a first image, noise included in a second image. The image noise removing apparatus includes: a spatial noise removing unit which executes an operation for removing the noise included in the second image using a pixel value included in the second image, thereby generating a spatial noise-free image; a reliability calculating unit which calculates a reliability indicating how dynamic the second image is, based on the spatial noise-free image, the second image, and a first noise-free image which is generated from the first image with the noise therein removed; and a temporal blending unit which performs, based on the reliability, a weighted summation on the second image and the first noise-free image, thereby removing the noise included in the second image.

It is noted that the overall or specific aspect may be implemented in the form of a system, a method, an integrated circuit, a computer program, or a computer-readable recording medium such as a CD-ROM, or any given combination thereof.

An image noise removing apparatus and an image noise removing method according to an implementation of the present invention successfully remove noise from a target image, by adoptively changing and optimizing the strength of temporal noise removal filtering provided to the target image.

DETAILED DESCRIPTION

Figure 1:
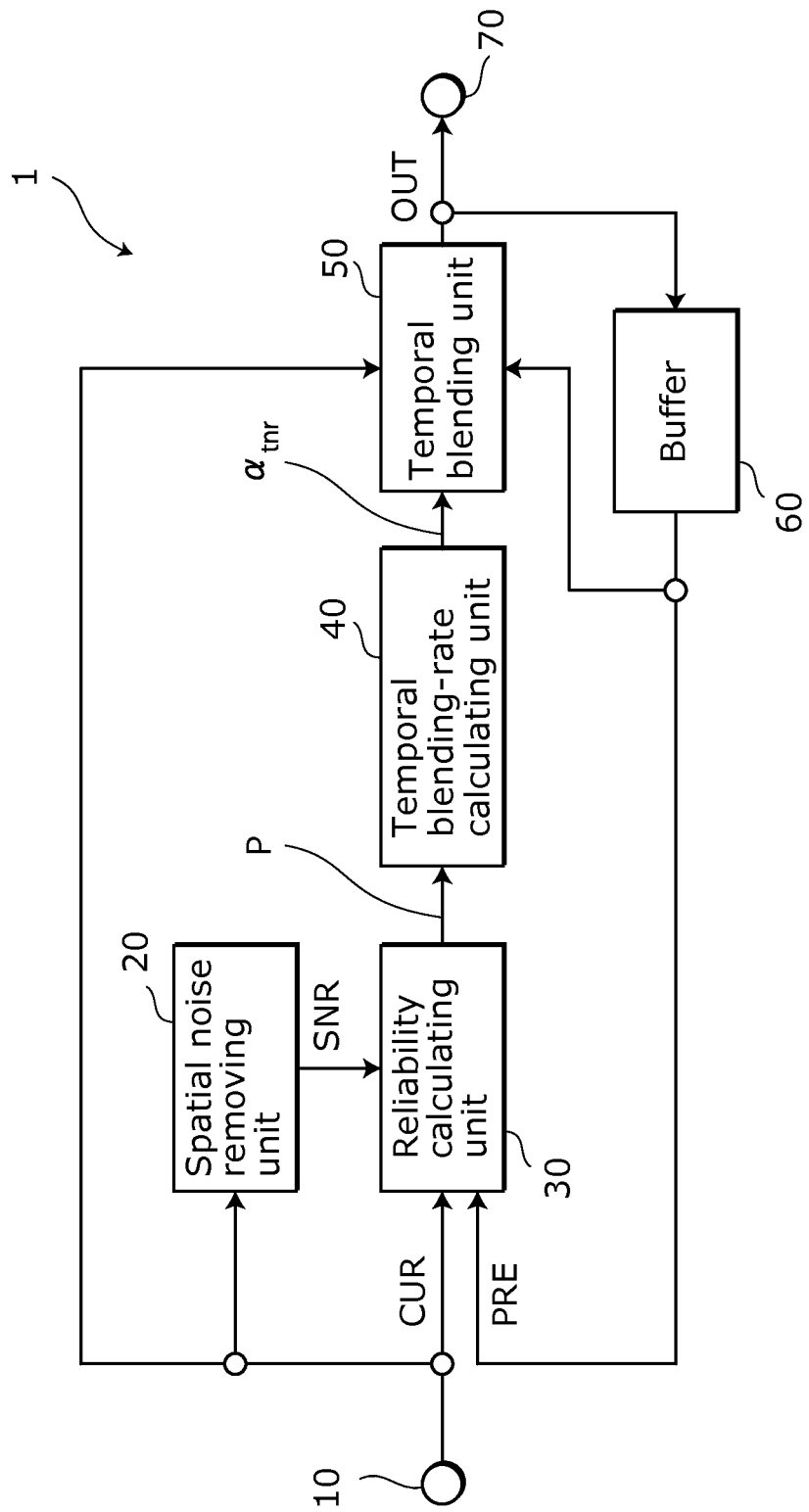
FIG. 1 illustrates a structure of an image noise removing apparatus according to Embodiment 1.

[Underlying Knowledge Forming Basis of the Present Invention]

In relation to the noise removing techniques disclosed in the Background Art section, the inventors have found the problems below.

Noise appears in image (video and still image) data, depending on environment where the image is captured and characteristics of image sensors. Noise includes light shot noise, dark noise, fixed pattern noise, and circuit noise. Since such noise deteriorates the quality of an image (image quality), image data is filtered so that the noise is removed or reduced.

A well-known technique to remove noise is to smooth pixel values using data of a region near target pixel data (pixel values). Exemplary smoothing includes filtering to obtain the average value of a region and median filtering to obtain the median value of a region near the target. Such noise removal filtering techniques are spatial noise removal filtering techniques carried out using data in a single image.

In contrast, temporal noise removal filtering techniques are used on video to reduce or remove noise therein. The temporal noise removal filtering involves smoothing using a correlation between consecutive images (frames), in a temporal direction, included in a video sequence. Exemplary temporal noise removal filtering includes obtaining the weighted average between target pixel data and pixel data of a frame which precedes the frame of the target pixel data.

A technique with combination of the spatial noise removal filtering and the temporal noise removal filtering selectively executes the temporal noise removal filtering if the target pixel data is of static portion in a frame and the spatial noise removal filtering if the target pixel data is of dynamic portion in a frame.

In order to switch from one of the above noise removal filtering techniques to the other, PTL 1 discloses a technique to output the final filtering result upon determining whether or not to employ the result of the temporal noise removal filtering based on the result of the spatial noise removal filtering.

PTL 2 discloses a technique to output the final filtering result upon determining whether or not to employ the result of the temporal noise removal filtering based on the result of the spatial noise removal filtering.

However, in order to enhance a noise removing capability for the temporal noise removal filtering in the technique to switch between the temporal noise removal filtering and the spatial noise removal filtering, it is essential to carry out smoothing in a temporal direction with great strength. Strong temporal noise removal filtering causes residual image around a dynamic region, and deteriorates image quality. In order to prevent the residual image, such strong temporal noise removal filtering cannot be carried out. The resulting temporal noise removal with insufficient filtering strength is less effective in removing noise.

Furthermore, in the case of determining whether or not to employ the result of the temporal noise removal filtering based on the result of the spatial noise removal filtering, the option is whether to validate or invalidate the result of the temporal noise removal filtering. Hence the difference in noise removing capability between the temporal noise removal filtering and the spatial noise removal filtering would cause unnaturalness on video when the two filtering techniques switch therebetween.

As described above, noise removal via the temporal noise removal filtering inevitably produces new noise (for example, residual image or unnaturalness on video). In other words, the temporal noise removal filtering poses a difficulty in having appropriate strength when removing noise from an image.

The present invention implements an image noise removing apparatus to provide an image with temporal noise removal filtering having appropriate strength.

In order to solve the above problems, an image noise removing apparatus according to an implementation of the present invention removes, after removal of noise from a first image, noise included in a second image. The image noise removing apparatus includes: a spatial noise removing unit which executes an operation for removing the noise included in the second image using a pixel value included in the second image, thereby generating a spatial noise-free image; a reliability calculating unit which calculates a reliability indicating how dynamic the second image is, based on the spatial noise-free image, the second image, and a first noise-free image which is generated from the first image with the noise therein removed; and a temporal blending unit which performs, based on the reliability, a weighted summation on the second image and the first noise-free image, thereby removing the noise included in the second image.

Such features make it possible to estimate motion in the second image with great accuracy, using the spatial noise-free image generated from the second image with the noise therein spatially removed, as well as the second image and the first noise-free image. Depending on the result of the estimation, the image noise removing apparatus can temporally remove the noise from the second image. The great accuracy in motion estimation executed on the second image successfully improves accuracy in temporal noise removal. Hence the image noise removing apparatus can provide an image with temporal noise removal filtering having appropriate strength.

A conventional technique estimates motion in the second image, using the second image and the first noise-free image. The resulting motion estimation, however, is known to be poor in accuracy. The present invention successfully improves accuracy in motion estimation result, using the spatial noise-free image generated from the second image, as well as the above two images.

For example, the reliability calculating unit calculates the reliability to be greater as a pixel included in the second image is less dynamic, and as the weighted summation, the temporal blending unit weighs the first noise-free image heavier as the reliability is greater.

Such features allow the second image to receive temporal noise removal filtering where the first noise-free image is weighted heavier as the second image is less likely to be dynamic. When a portion of the second image appears less likely to be dynamic, the first noise-free image with noise already removed is weighted heavily so that, the image after the temporal noise removal filtering can have little noise.

For example, the reliability calculating unit calculates the reliability to be greater as a difference is smaller between a pixel value of a pixel included in the first noise-free image and a pixel value of a co-located pixel included in the second image.

For example, the reliability calculating unit calculates the reliability to be greater as a difference is smaller between a pixel value of a pixel included in the first noise-free image and a pixel value of a co-located pixel included in the spatial noise-free image.

Such a feature weighs the first noise-free image heavily in temporal noise removal upon determining that the second image is less likely to represent motion. Since the first noise-free image has already had noise removed, the image after the temporal noise removal filtering can have little noise.

For example, the reliability calculating unit calculates the reliability based on a ratio of the difference to a predetermined deviation in distribution of pixel values which changes due to noise.

Hence, in determining the level of the difference between pixel values, the image noise removing apparatus can determine the level using the ratio of the difference to the predetermined deviation in distribution of pixel values which changes due to noise.

For example, the pixel value includes elements, and the reliability calculating unit calculates the reliability to be greater as an angle formed between a first vector and a second vector is narrower, the first vector having, as an element, a difference between a pixel value of a pixel included in the spatial noise-free image and a pixel value of a co-located pixel in the second image, and the second vector having, as an element, a difference between a pixel value of a pixel included in the first noise-free image and a pixel value of a co-located pixel included in the second image.

Hence the image noise removing apparatus determines that the second image is less likely to appear dynamic as a smaller angle is formed between (i) the first vector representing the difference between the spatial noise-free image and the second image and (ii) the second vector representing the difference between the first noise-free image and the second image. The image noise removing apparatus then weighs the first noise-free image heavily in the temporal noise removal. Since the first noise-free image has already had noise removed, the image after the temporal noise removal filtering can have little noise.

For example, the first noise-free image is generated from the first image with the noise therein removed by the image noise removing apparatus.

Hence the image noise removing apparatus can use, as the first noise-free image, an image generated from the first image with noise removed temporally by the image noise removing apparatus.

The first image is one of images included in a video sequence, and the second image is one of the images included in the video sequence, and is located immediately after the first image in order of time.

Such features make it possible to sequentially and temporally remove noise from each of chronologically consecutive images included in a video sequence, based on the result of the noise removal executed on the image immediately before the each image.

For example, the image noise removing apparatus further includes a spatial blending unit which performs, based on the reliability, a weighted summation on the second image and the spatial noise-free image, thereby generating a spatially blended image, wherein the temporal blending unit further performs, based on the reliability, the weighted summation on the spatially blended image and the first noise-free image, thereby removing the noise included in the second image, the first noise-free image being generated from the first image with the noise therein removed.

Such features make it possible to estimate motion in the second image with great accuracy, spatially remove noise from the second image depending on the result of the motion estimation, and temporally remove noise from the second image. The great accuracy in motion estimation executed on the second image successfully improves accuracy in spatial noise removal. Then, temporal noise removal following the spatial noise removal can provide an image with more appropriate temporal noise removal filtering.

For example, the reliability calculating unit calculates the reliability to be greater as a pixel included in the second image is less dynamic, as the weighted summation, the spatial blending unit weighs the second image heavier as the reliability is greater, and as the weighed summation, the temporal blending unit weighs the first noise-free image heavier as the reliability is greater.

Hence, as the second image appears less likely to be dynamic, the second image can receive spatial noise removal filtering where the second image is weighted heavier. When a portion of the second image appears less likely to be dynamic, the second image is weighted heavier, so that a side effect such as blur occurring in the spatial noise removal can be prevented.

An image noise removing method according to an implementation of the present invention removes, after removal of noise from a first image, noise included in a second image. The image noise removing method includes: executing an operation for removing the noise included in the second image using a pixel value included in the second image, thereby generating a spatial noise-free image; calculating a reliability indicating how dynamic the second image is, based on the spatial noise-free image, the second image, and a first noise-free image which is generated from the first image with the noise therein removed; and performing, based on the reliability, a weighted summation on the second image and the first noise-free image, thereby removing the noise included in the second image.

Such features provide effects similar to those of the image noise removing apparatus.

A program according to an implementation of the present invention causes a computer to execute the image noise removing method.

Such features provide effects similar to those of the image noise removing apparatus.

An integrated circuit according to an implementation of the present invention removes, after removal of noise from a first image, noise included in a second image. The integrated circuit includes: a spatial noise removing unit which executes an operation for removing the noise included in the second image using a pixel value included in the second image, thereby generating a spatial noise-free image; a reliability calculating unit which calculates a reliability indicating how dynamic the second image is, based on the spatial noise-free image, the second image, and a first noise-free image which is generated from the first image with the noise therein removed; and a temporal blending unit which performs, based on the reliability, a weighted summation on the second image and the first noise-free image, thereby removing the noise included in the second image.

Such features provide effects similar to those of the image noise removing apparatus.

It is noted that the overall or specific aspect may be implemented in the form of a system, a method, an integrated circuit, a computer program, or a computer-readable recording medium such as a CD-ROM, or any given combination thereof.

Described hereinafter are embodiments with reference to the drawings.

It is noted that the embodiments below overall or specific examples. The numerical values, shapes, materials, constituent elements, arrangement positions of and connecting schemes between the constituent elements, steps, and an order of steps all described in the embodiment are examples, and shall not be defined as they are. Hence, among the constituent elements in the embodiment, those not described in an independent claim representing the most generic concept of the present invention are introduced as optional ones.

[Embodiment 1]

FIG. 1 illustrates a structure of an image noise removing apparatus according to Embodiment 1.

As illustrated in FIG. 1, an image noise removing apparatus 1 includes an input image terminal 10, a spatial noise removing unit 20, a reliability calculating unit 30, a temporal blending-rate calculating unit 40, a temporal blending unit 50, a buffer 60, and an output image terminal 70.

The input image terminal 10 receives an image to be inputted (hereinafter referred to as "input image") into the image noise removing apparatus 1. Specifically, the input image terminal 10 receives the pixel value (pixel data) of a target pixel and a pixel value (pixel data) of a pixel in the vicinity of the target pixel. The input image corresponds to a second image.

The spatial noise removing unit 20 removes noise by performing smoothing using the pixel value received by the input image terminal 10 and representing the target pixel, and the pixel value of the vicinity pixel. The image with noise removed corresponds to a spatial noise-free image.

The reliability calculating unit 30 calculates a probability that the target pixel received by the input image terminal 10 is static in relation to a pixel which is included in a previous input image (corresponding to a first image) and co-located with the target pixel. In other words, the reliability calculating unit 30 receives (i) the pixel value of the target pixel received by the input image terminal 10, (ii) a pixel value of a pixel which is co-located with the target pixel and included in an image that is a previous image stored in a buffer and has noise removed, and (iii) a pixel value of a pixel which is co-located with the target pixel and included in an image with noise removed by the spatial noise removing unit 20. Based on the received pixel values, the reliability calculating unit 30 calculates a probability that the target pixel is static in relation to a pixel which is (i) located at the same position as the target pixel and (ii) included in a previous image represented by a noise-free signal. How to calculate the probability will be described later. It is noted that the case where "the pixel is static" means that a captured object corresponding to the pixel does not change. In other words, when the same captured object corresponds to two pixels each included in a different image, it is the case where "the pixel is static". Furthermore, when the two pixels receive noise in different level and thus their pixel values are different, it is also the case where "the pixel is static". In contrast, when a different captured object corresponds to each of two pixels included in a different image, it is the case where "the pixel is not static".

Specifically, when two images are extracted from a video sequence including static objects (such as scenery and a building), a pixel in one of the image is static in relation to a pixel in the other one image. Furthermore, when different noise appears in each of the pixel in the one image and the pixel in the other one image, their pixel values are different; however, the pixel in the one image is static in relation to the pixel in the other one image. In contrast, when two images are extracted from a video sequence including dynamic objects (such as a moving car and a person waving his or her hand), a pixel in one of the images is not static in relation to a pixel in the other one image for the dynamic part in the images.

It is noted that the "previous image stored in a buffer" is an image having noise removed and preceding the input image received by the input image terminal 10. In other words, the previous image may be inputted one image before the input image and have noise removed or may be inputted predetermined images before the input image and have noise removed. Here, the predetermined images before may be where the difference between the input image and the previous image is relatively small. It is noted that the "previous image stored in a buffer" corresponds to a first noise-free image.

Based on the probability calculated by the reliability calculating unit 30 and indicating that the target pixel is static, the temporal blending-rate calculating unit 40 calculates a blending rate (mixing rate) between (i) the pixel value used by the temporal blending unit 50 and received by the input image terminal 10 and (ii) a pixel value of a previous image stored in the buffer.

Based on the blending rate calculated by the temporal blending-rate calculating unit 40, the temporal blending unit 50 blends the pixel value received by the input image terminal 10 with a pixel value of a pixel which is co-located with the pixel of the received pixel value and included in a previous image recorded on the buffer and represented by a noise-free signal.

Figure 2:
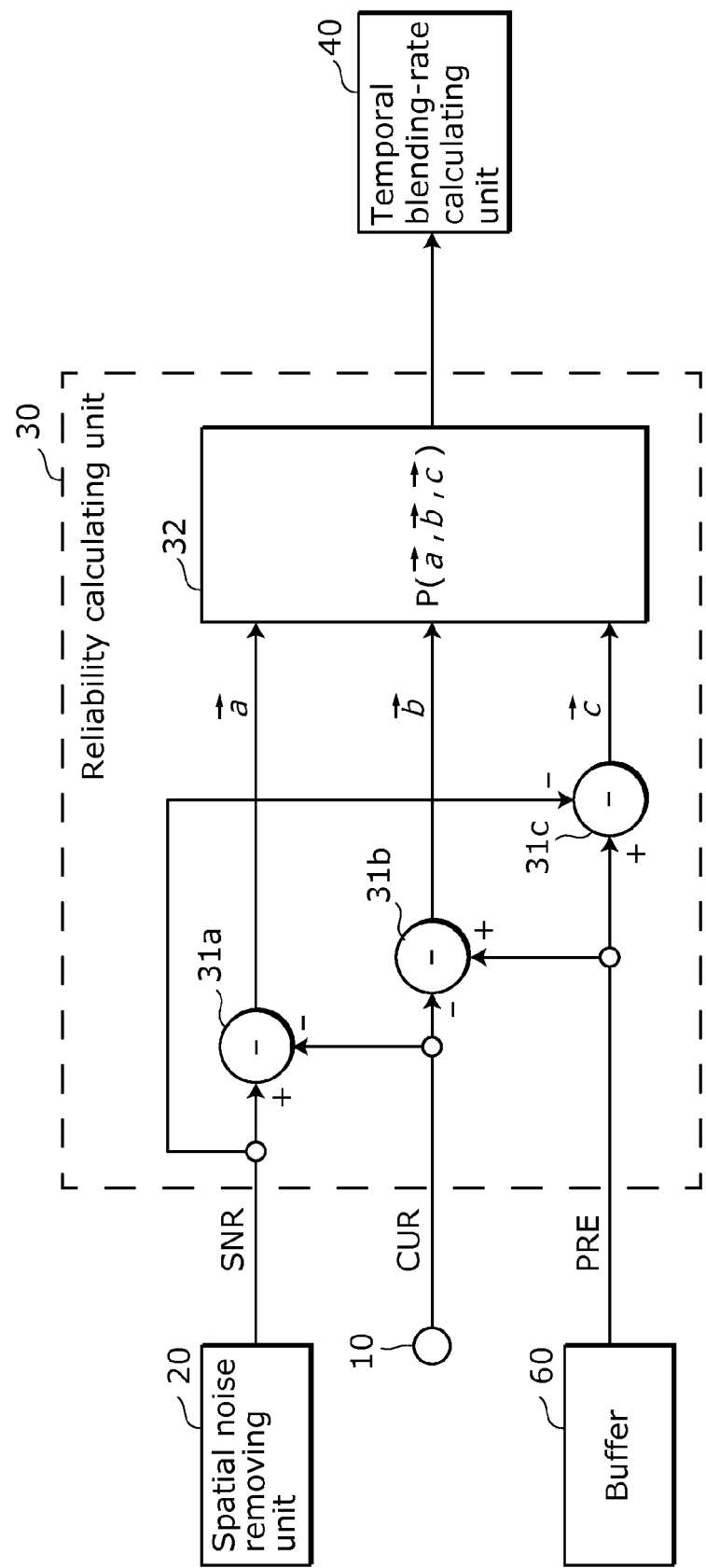
FIG. 2 illustrates a structure of a reliability calculating unit according to Embodiment 1.

FIG. 2 illustrates a structure of the reliability calculating unit 30 according to Embodiment 1.

As represented in FIG. 2, the reliability calculating unit 30 includes a difference operating units 31a to 31c, and a probability calculating unit 32. From now on, CUR is a pixel value received by the input image terminal 10 and inputted into the reliability calculating unit 30, SNR is a pixel value with noise (spatially removing noise) removed by the spatial noise removing unit 20, and PRE is the image data of an image stored in the buffer 60.

The difference operating unit 31a calculates a=SNR−CUR.

The difference operating unit 31b calculates b=PRE−CUR.

The difference operating unit 31c calculates c=PRE−SNR.

A typical pixel value includes multiple kinds of color component data such as RGB or YCbCr. Thus the a, b, and c calculated by the difference operating units 31a, 31b, and 31c are vectors each having multiple elements. For example, when a pixel value includes three kinds of information, YCbCr, the vectors a, b, and c are represented as shown in Math. 1.

[Math. 1]

$$\vec{a} = (NR_y - CUR_y, NR_{cb} - CUR_{cb}, NR_{cr} - CUR_{cr})$$
$$\vec{b} = (PRE_y - CUR_y, PRE_{cb} - CUR_{cb}, PRE_{cr} - CUR_{cr})$$
$$\vec{c} = (PRE_y - NR_y, PRE_{cb} - NR_{cb}, PRE_{cr} - NR_{cr})$$

Expression 1

The indices y, cb, and cr respectively represent a Y component, a Cb component, and a Cr component of a pixel value. The vectors a, b, and c are three-dimensional vectors when a pixel value includes three elements (for example, YCbCr and RGB). The vectors, however, may be one-dimensional vectors when a pixel value includes only an Y component as seen grayscale (when Cb and Cr are always 0), or may be three-dimensional vectors with Cb and Cr set to 0.

Figure 3:
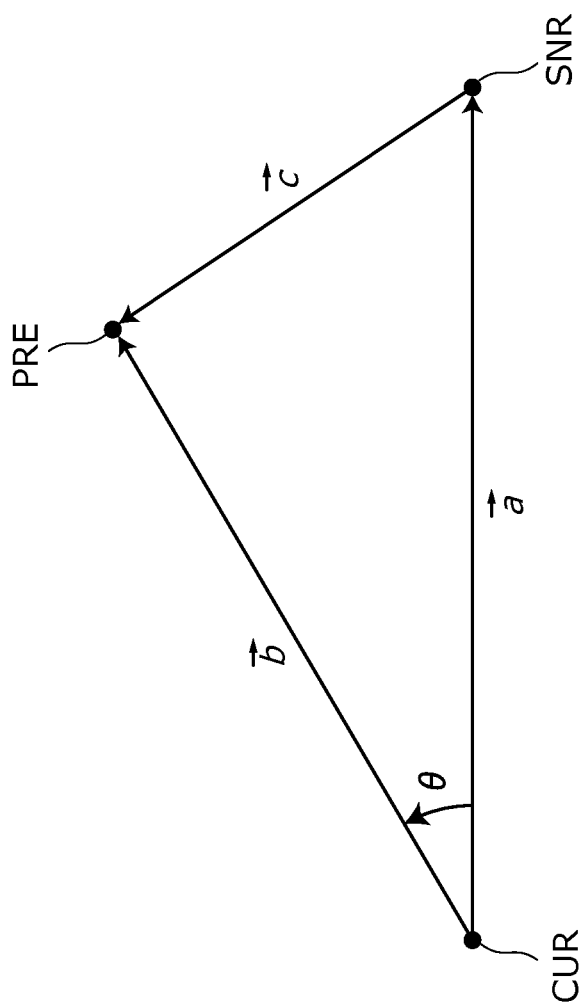
FIG. 3 illustrates a relationship between a pixel value and a vector according to Embodiment 1.

FIG. 3 illustrates a relationship between a pixel value and a vector according to Embodiment 1. FIG. 3 illustrates a relationship between the pixel values (CUR, SNR, and PRE) and the vectors (a, b, and c).

Specifically, each of the pixel values CUR, SNR, and PRE is located at a corresponding one of coordinate sets. The vector a has CUR as the origin and SNR as the endpoint. The vector b has CUR as the origin and PRE as the endpoint. The vector c has SNR as the origin and PRE as the endpoint.

According to Expression 2, the probability calculating unit 32 calculates a probability P that pixel data is static.

[Math. 2]

$$P(\vec{a}, \vec{b}, \vec{c}) = e^{-\frac{1}{2}\alpha\omega_0} \times e^{-\frac{1}{2}\beta\omega_1} \times e^{-\frac{1}{2}\gamma\omega_2}$$
$$= e^{-\frac{1}{2}(\alpha\omega_0 + \beta\omega_1 + \gamma\omega_2)}$$

Expression 2

Here, $\alpha$, $\beta$, and $\gamma$ are constants provided from outside. Furthermore, $\omega 0$, $\omega 1$, and $\omega 2$ are respectively obtained by Expressions 3, 4, and 5.

[Math. 3]

$$\omega_0 = \left(\frac{\|\vec{b}\|}{\sigma}\right)^2$$

Expression 3

[Math. 4]

$$\omega_1 = \left(\frac{\|\vec{c}\|}{\sigma}\right)^2$$

Expression 4

[Math. 5]

$$\omega_2 = (1 - \cos\theta^2) = \left(1 - \frac{\vec{a} \cdot \vec{b}}{|\vec{a}||\vec{b}|}\right)^2$$

Expression 5

Figure 4:
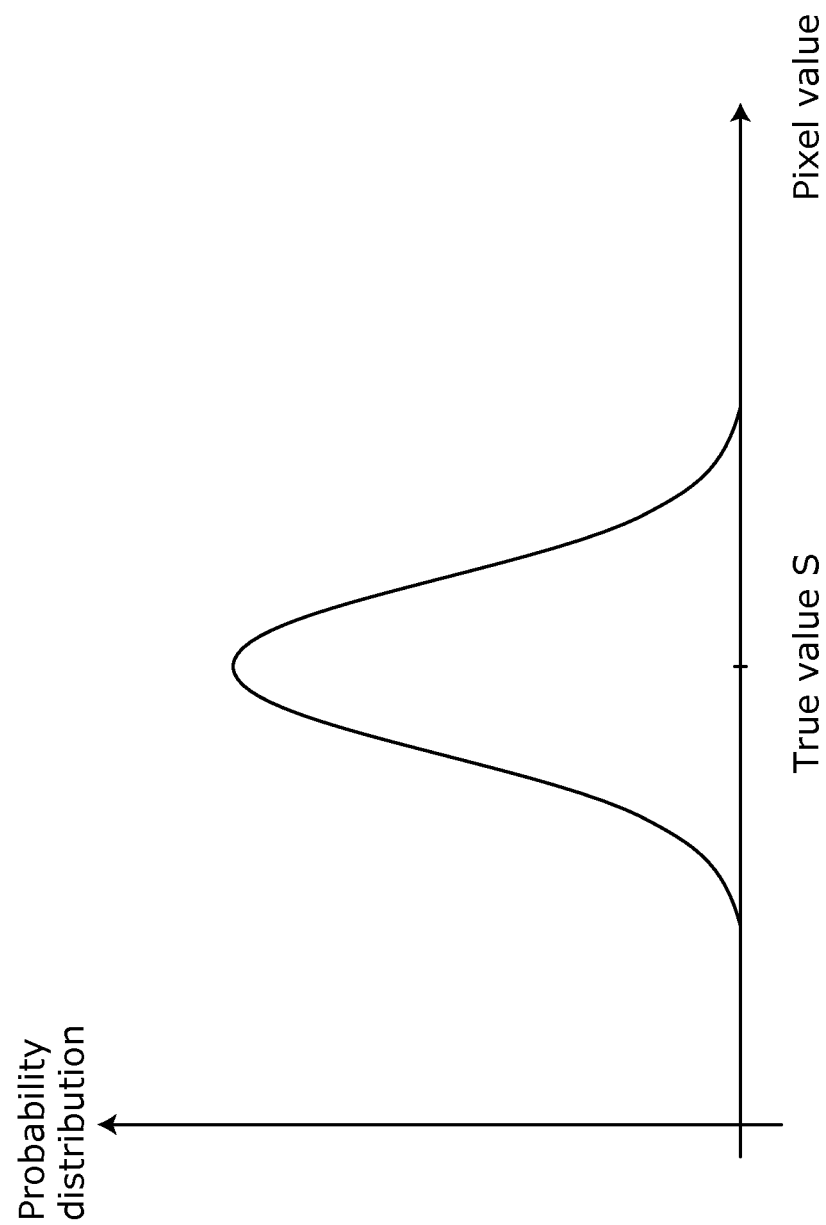
FIG. 4 illustrates noise probability distribution.

Here, $\sigma$, the constant provided from outside, is a deviation in the noise-model normal distribution (distribution of pixel values which change by noise) included in an image. FIG. 4 exemplifies probability distribution of noise included in an image. The probability distribution is modeled in the form of normal distribution of the deviation a with a noise-free true pixel value S in the middle.

Typically, the probability P that pixel data is static can be calculated simply by b (=PRE−CUR), which is low in accuracy. Simply using only b is equivalent to using only the first factor in the right side of Expression 2.

In contrast, Embodiment 1 is based on a case different from an ideal case where a pixel value with noise removed temporally and a pixel with noise removed spatially are both correct. Specifically, the pixel value with noise removed temporally on the assumption that the noise is completely removed by temporal noise removal is deemed equal to the pixel value with noise removed spatially on the assumption that the noise is completely removed by spatial noise removal. In the ideal case, the difference |c| between the both pixel values is 0, and the vectors a and b form the angle θ of 0. It is realistically improbable to implement the above ideal case, and there is a case where some minor differences from the ideal case are found. Here, the following relationships hold: the difference |c| between both the pixel values is relatively small and the angle θ formed between the vectors a and b is relatively narrow. Hence, the above |c| and θ is calculated by Expression 2, further using the probability P. In contrast, if the above relationships do not hold, the temporal noise removal is low in accuracy. In other words, the target pixel is highly likely to move from the previous image (the target pixel is not static).

Using the probability P that the pixel value calculated by the reliability calculating unit 30 is static, the temporal blending-rate calculating unit 40 calculates a blending rate $\alpha_{tnr}$ to be used by the temporal blending unit 50. The blending rate $\alpha_{tnr}$ is normalized and outputted; however, $\alpha_{tnr}$ does not have to be normalized in relation to an operation executed by the proceeding temporal blending unit 50. The blending rate $\alpha_{tnr}$ may be obtained by an operation using the probability P, or may be calculated by a prepared table or relationship.

Figure 5:
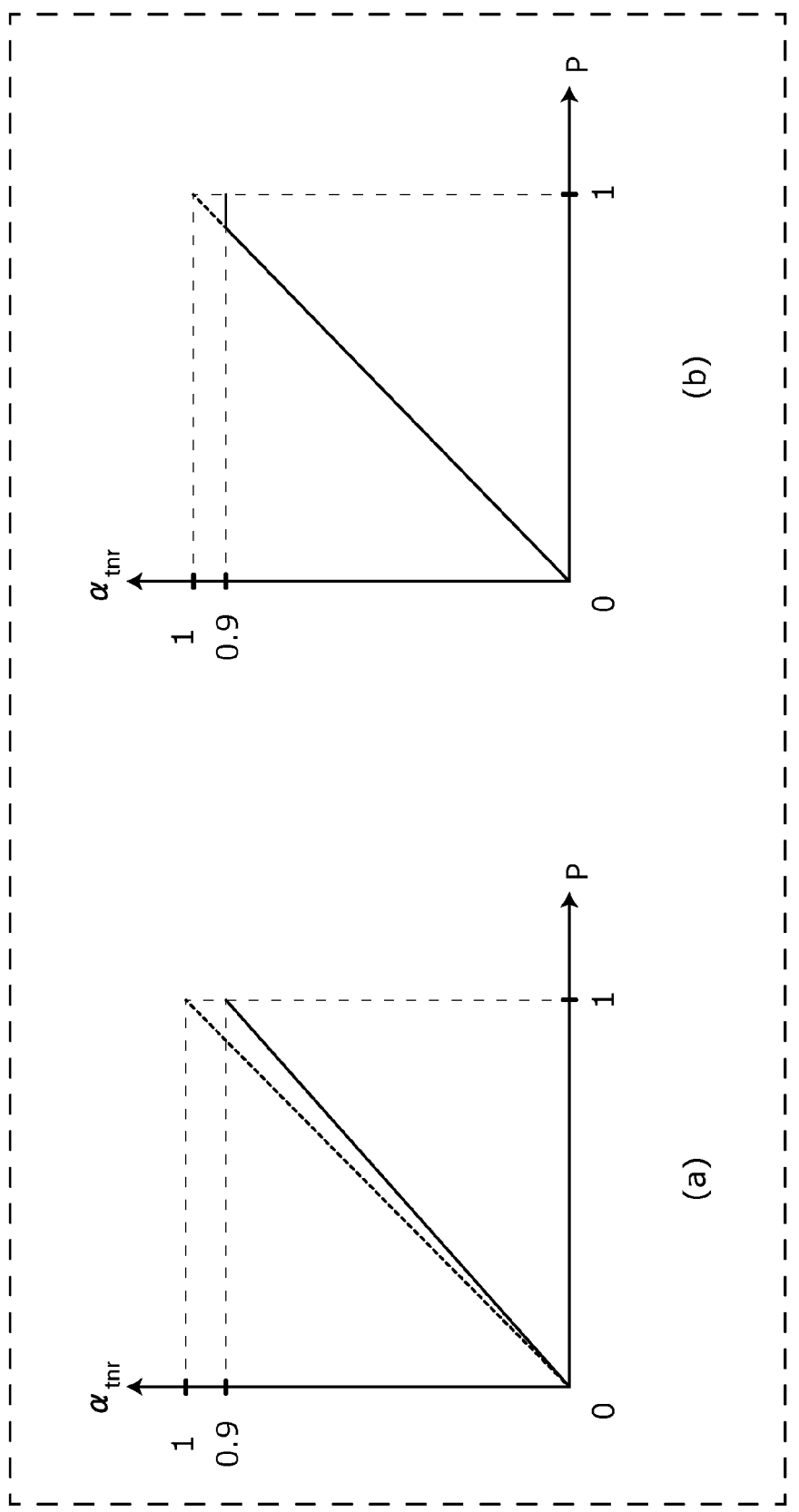
FIG. 5 illustrates a corresponding relationship between $\alpha_{tnr}$ and P.

FIG. 5 illustrates a corresponding relationship between $\alpha_{tnr}$ and P.

The illustration (a) in FIG. 5 is the first example of the corresponding relationship between $\alpha_{tnr}$ and P. The illustration (a) represents that $\alpha_{tnr}$ changes in proportion to P when P changes from 0 to 1. The blending rate $\alpha_{tnr}$ changes in the range from 0 to 0.9, for example.

The illustration (b) in FIG. 5 is the second example of the corresponding relationship between $\alpha_{tnr}$ and P. When P changes from 0 to 1, $\alpha_{tnr}$ (i) changes in proportion to P in the section where P changes from 0 to a predetermined number, and (ii) remains constant in the section where P changes from the predetermined number to 1. As described above, the blending rate αtnr changes in the range from 0 to 0.9, for example.

When P changes from 0 to 1, the above features allow $\alpha_{tnr}$ to change from 0 to the predetermined rate.

It is noted that the probability P normalized by 1 is directly employed as the blending rate $\alpha_{tnr}$ normalized by 1. This feature can eliminate the need for the temporal blending-rate calculating unit 40 and simplifies the structure of the image noise removing apparatus 1.

The temporal blending unit 50 outputs an output image OUT, using the blending rate $\alpha_{tnr}$ calculated by the temporal blending-rate calculating unit 40. For example, if $\alpha_{tnr}$ is normalized by 1, the following relationship holds: OUT=$\alpha_{tnr}$× PRE+(1−$\alpha_{tnr}$)×CUR.

The above features and processing make it possible to remove noise from a target image, by adoptively changing and optimizing the strength of temporal noise removal filtering provided to the target image.

Figure 6:
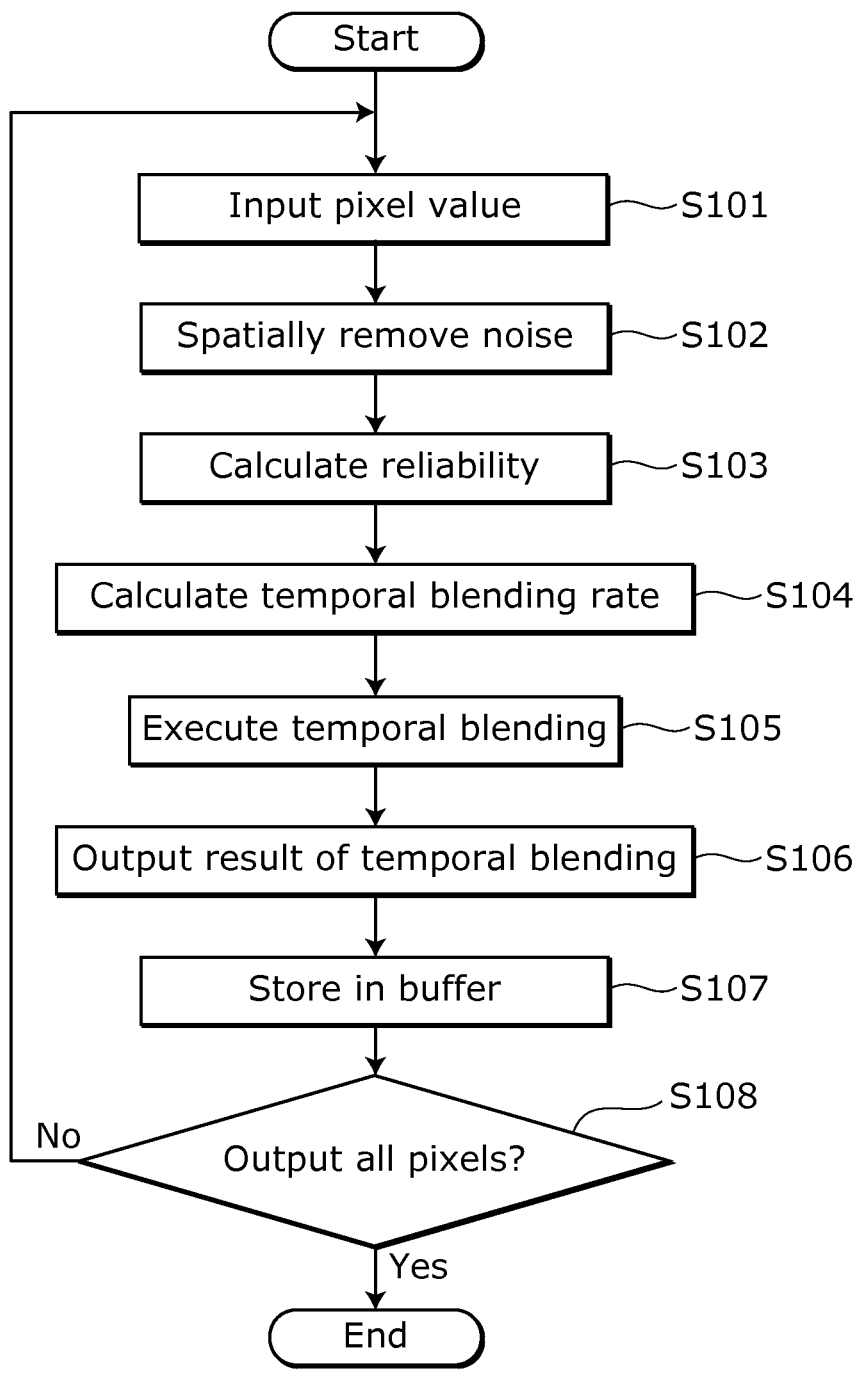
FIG. 6 depicts a flowchart representing a flow of processing according to Embodiment 1.

FIG. 6 depicts a flowchart representing a flow of processing according to Embodiment 1. FIG. 6 depicts a flowchart representing processing executed on one image according to Embodiment 1.

Step S101 inputs a pixel value.

Step S102 spatially removes noise from the pixel value inputted in Step S101.

Step S103 calculates a probability that the pixel inputted in Step S101 is static, based on the pixel value with the noise removed spatially in S102, the pixel value inputted in Step S101, and a pixel value in a previous image.

Based on the probability calculated in Step S103, Step S104 calculates a temporal blending rate.

Based on the temporal blending rate calculated in Step S104, Step S105 temporally blends the pixel value inputted in Step S101 with the pixel value of the previous image.

Step S106 outputs an output image on which the temporal blending is executed in Step S105.

Step S107 stores the output image in a buffer.

Step S108 determines whether or not all the pixels are processed. If all the pixels are processed, the processing on the one image ends (Step S109). If not all the pixels are processed, the sequence goes back to Step S101.

The above processing makes it possible to execute noise removal filtering on one image by adoptively changing the strength of the temporal noise removal filtering. In filtering a video sequence, the above processing is sequentially executed on each of the images included in the video sequence so that all the images included in the video sequence receive the noise removal filtering.

As described above, the image noise removing apparatus according to Embodiment 1 can estimate motion in the second image with great accuracy, using the spatial noise-free image generated from the second image with noise therein spatially removed, as well as the second image and a first noise-free image. Depending on the result of the estimation, the image noise removing apparatus can temporally remove noise from the second image. The great accuracy in motion estimation executed on the second image successfully improves accuracy in temporal noise removal. Hence the image noise removing apparatus can provide an image with temporal noise removal filtering having appropriate strength.

A conventional technique estimates motion in the second image, using the second image and the first noise-free image. The resulting motion estimation, however, is known to be poor in accuracy. The present invention successfully improves accuracy in motion estimation result, using the spatial noise-free image generated from the second image, as well as the above two images.

Furthermore, as the second image is less likely to be dynamic, the image can receive temporal noise removal filtering where the first noise-free image is weighted heavier. When a portion of the second image appears less likely to be dynamic, the first noise-free image with noise already removed is weighted heavily so that, the image after the temporal noise removal filtering can have little noise.

In addition, the image noise removing apparatus weighs the first noise-free image heavily in the temporal noise removal upon determining that the second image appears less likely to be dynamic. Since the first noise-free image has already had noise removed, the image after the temporal noise removal filtering can have little noise.

Moreover, in determining the level of the difference between pixel values, the image noise removing apparatus can determine the level using the ratio of the difference to the deviation of the pixel values which change by noise.

In addition, the image noise removing apparatus determines that the second image is less likely to appear dynamic as a smaller angle is formed between (i) the first vector representing the difference between the spatial noise-free image and the second image and (ii) the second vector representing the difference between the first noise-free image and the second image. The image noise removing apparatus then weighs the first noise-free image heavily in the temporal noise removal. Since the first noise-free image has already had noise removed, the image after the temporal noise removal filtering can have little noise.

Furthermore, the image noise removing apparatus can use, as the first noise-free image, an image generated from the first image with noise removed temporally by the image noise removing apparatus.

Moreover, the image noise removing apparatus can sequentially and temporally remove noise from each of chronologically consecutive images included in a video sequence, based on the result of the noise removal executed on the image immediately before the each image.

[Embodiment 2]

Figure 7:
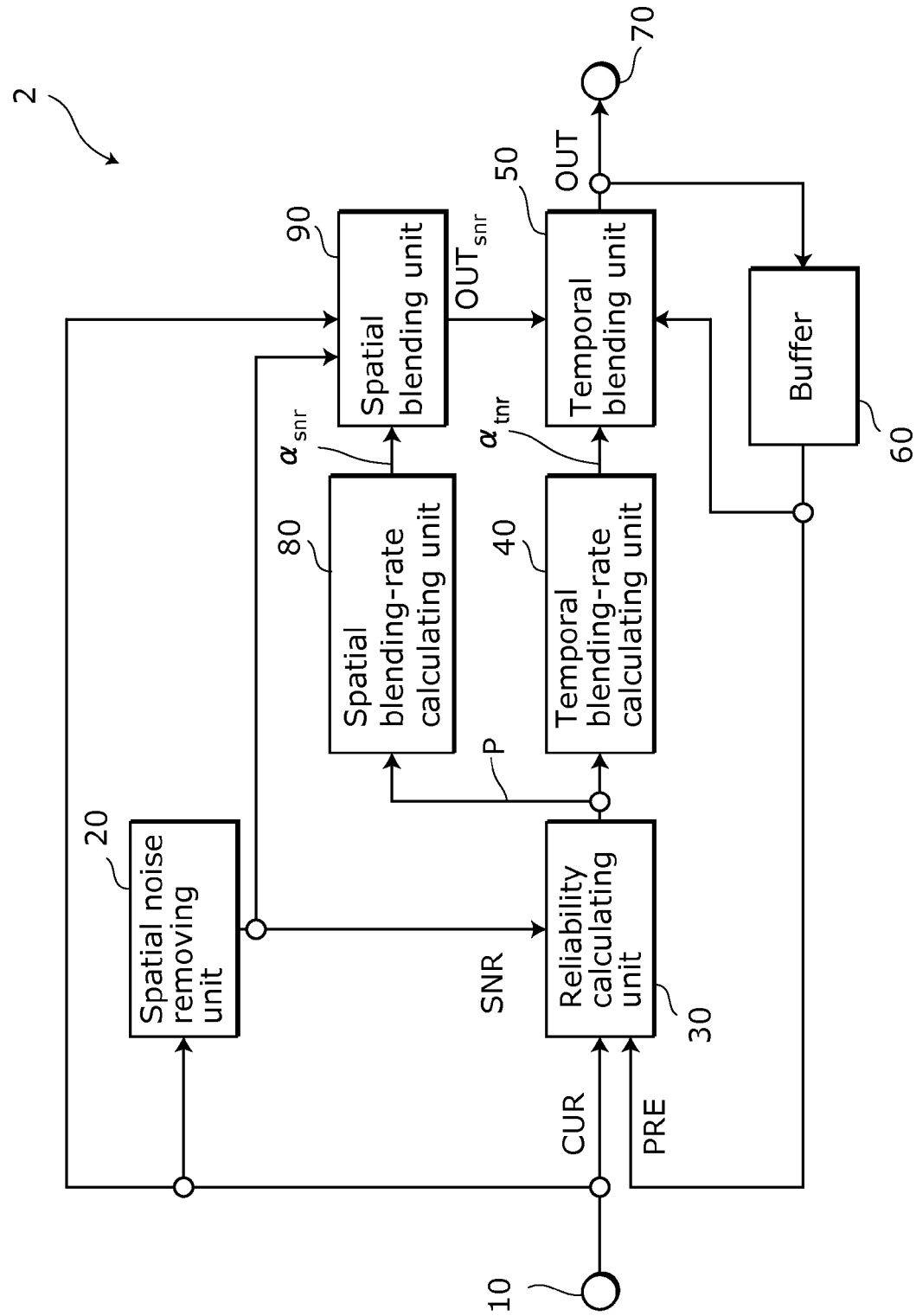
FIG. 7 illustrates a structure of an image noise removing apparatus according to Embodiment 2.

FIG. 7 illustrates a structure of an image noise removing apparatus according to Embodiment 2.

As illustrated in FIG. 7, an image noise removing apparatus 2 includes the input image terminal 10, the spatial noise removing unit 20, the reliability calculating unit 30, the temporal blending-rate calculating unit 40, the temporal blending unit 50, the buffer 60, the output image terminal 70, a spatial blending-rate calculating unit 80, and a spatial blending unit 90.

The input image terminal 10 receives an image (hereinafter referred to as "input image") to be inputted into the image noise removing apparatus 1. Specifically, the input image terminal 10 receives the pixel value (pixel data) of a target pixel and a pixel value (pixel data) of a pixel in the vicinity of the target pixel.

The spatial noise removing unit 20 removes noise by performing smoothing using the pixel value received by the input image terminal 10 and representing the target pixel, and the pixel value of the vicinity pixel.

The reliability calculating unit 30 calculates a probability that the target pixel received by the input image terminal 10 is static in relation to a pixel which is included in a previous input image and co-located with the target pixel. In other words, the reliability calculating unit 30 receives (i) the pixel value of the target pixel received by the input image terminal 10, (ii) a pixel value of a pixel which is co-located with the target pixel and included in an image that is a previous image stored in a buffer and has noise removed, and (iii) a pixel value of a pixel which is co-located with the target pixel and included in an image with noise removed by the spatial noise removing unit 20. Based on the received pixel values, the reliability calculating unit 30 calculates a probability that the target pixel is static in relation to a pixel which is (i) co-located with target pixel and (ii) included in a previous image represented by a noise-free signal.

Based on the probability calculated by the reliability calculating unit 30 and indicating that the target pixel is static, the spatial blending-rate calculating unit 80 calculates a blending rate between (i) the pixel value used by the spatial blending unit 90 and received by the input image terminal 10 and (ii) a pixel value with noise removed spatially by the spatial noise removing unit 20.

Based on the blending rate calculated by the spatial blending-rate calculating unit 80, the spatial blending unit 90 blends the pixel value received by the input image terminal 10 with a pixel value of a pixel which is (i) co-located with the received pixel value and (ii) included in an image whose noise is removed by the spatial noise removing unit 20.

Based on the probability calculated by the reliability calculating unit 30 and indicating that the target pixel is static, the temporal blending-rate calculating unit 40 calculates a blending rate (mixing rate) between (i) a pixel value of an output image to be used by the temporal blending unit 50 and provided from the spatial blending unit 90 and (ii) a pixel value of a pixel which is co-located with the target and included in a previous image stored in the buffer and represented by a noise-free signal.

Based on the blending rate calculated by the temporal blending-rate calculating unit 40, the temporal blending unit 50 blends the pixel value provided from the spatial blending unit 90 with a pixel value of a pixel which is co-located with the target pixel and included in a previous image stored in the buffer, and generates an output image. The temporal blending unit 50 then outputs the generated output image.

Based on the probability P that the target pixel is static according to Embodiment 1, the spatial blending-rate calculating unit 80 calculates the blending rate $\alpha_{snr}$.

The blending rate $\alpha_{snr}$ is calculated based on the issues below, for example. Typical smoothing by spatial noise removal causes a side effect such as blur occurring in an image. Hence, if the image is likely to be static, the blending rate is adjusted so that, in blending (i) the pixel value used by the spatial blending unit 90 and received by the input image terminal 10 with (ii) a pixel value with noise removed spatially by the spatial noise removing unit 20, the pixel value received by the input image terminal 10 is blended with a relatively high proportion so that a side effect such as blur is reduced.

The blending rate $\alpha_{snr}$ is normalized and outputted; however, $\alpha_{snr}$ does not have to be normalized in relation to an operation executed by the proceeding spatial blending unit 90. The blending rate $\alpha_{snr}$ may be obtained by an operation using the probability P, or may be calculated by a prepared table or relationship. The corresponding relationship may be the one illustrated in FIG. 5 according to Embodiment 1.

Without taking the side effect caused by the spatial noise removal consideration, the probability P normalized by 1 may be directly employed as the blending rate $\alpha_{snr}$ normalized by 1. This feature can eliminate the spatial blending-rate calculating unit 80 and simplify the structure of the image noise removing apparatus 2.

Using the blending rate $\alpha_{snr}$ calculated by the spatial blending-rate calculating unit 80, the spatial blending unit 90 outputs an output result $OUT_{snr}$. For example, the following relationship holds: $OUT_{snr} = \alpha_{snr} \times CUR + (1 - \alpha_{snr}) \times SNR$, where $\alpha_{snr}$ is normalized by 1.

The temporal blending unit 50 outputs an output image OUT, using the blend rate $\alpha_{tnr}$ calculated by the temporal blending-rate calculating unit 40. For example, if $\alpha_{tnr}$ is normalized by 1, the following relationship holds: $OUT = \alpha_{tnr} \times PRE + (1 - \alpha_{tnr}) \times OUT_{snr}$.

The above features and processing make it possible to remove noise from a target image, by adoptively changing and optimizing the strength of temporal noise removal filtering provided to the target image, and to perform the noise removal through smooth switching between the temporal noise removal filtering and the spatial noise removal filtering on a dynamic portion.

Figure 8:
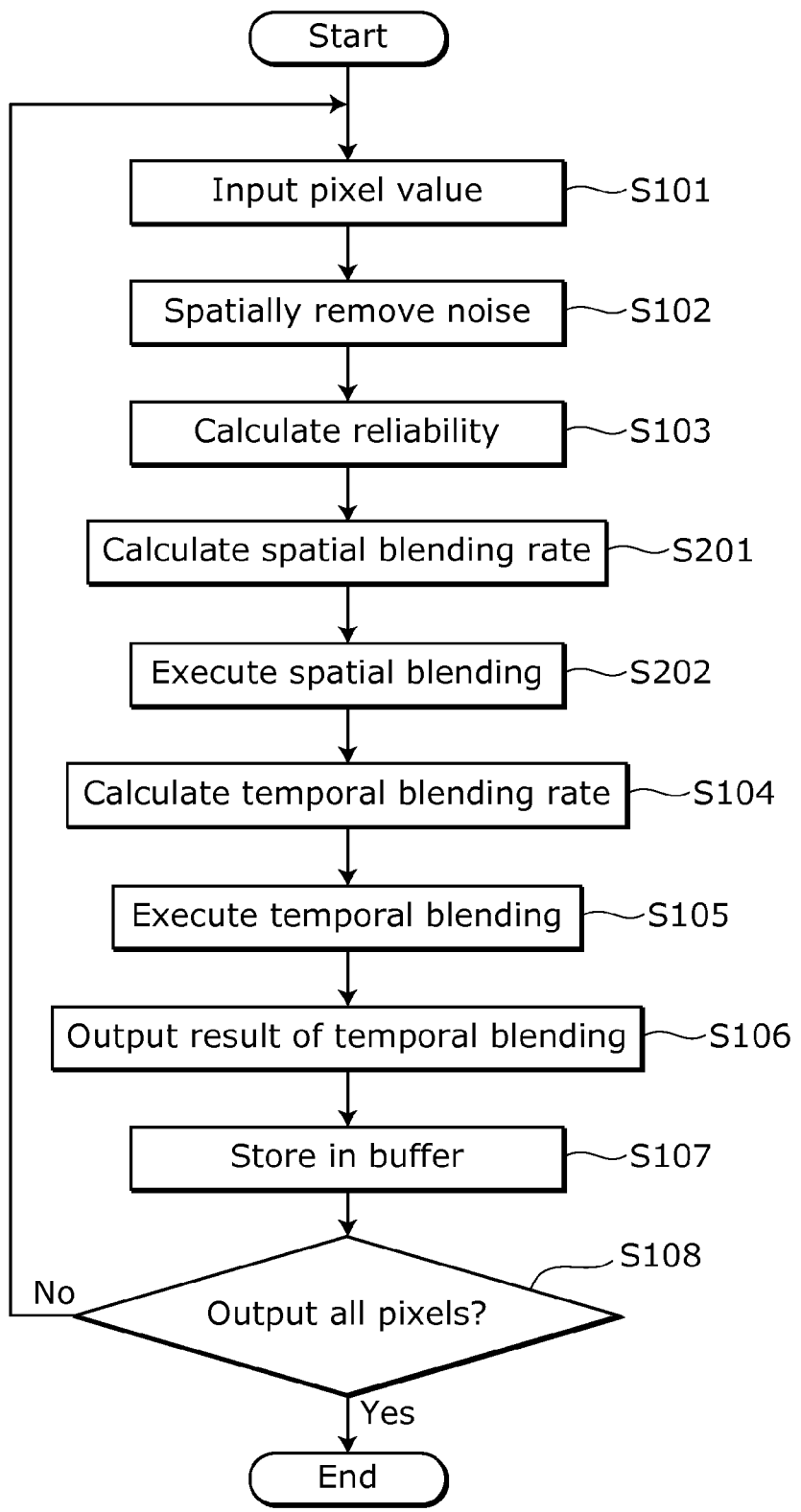
FIG. 8 depicts a flowchart representing a flow of processing according to Embodiment 2.

FIG. 8 depicts a flowchart representing a flow of processing according to Embodiment 2. FIG. 8 depicts a flowchart representing processing executed on one image according to Embodiment 2.

Step S101 inputs a pixel value.

Step S102 spatially removes noise from the pixel value inputted in Step S101.

Based on the pixel value with the noise removed spatially in S102, the pixel value inputted in Step S101, and a pixel value in a previous image, Step S103 calculates a probability that the pixel inputted in Step S101 is static.

Based on the probability calculated in Step S103, Step S201 calculates a spatial blending rate.

Based on the spatial blending rate calculated in Step S201, Step S202 spatially blends the pixel value inputted in Step S101 with the pixel value having noise spatially removed.

Based on the probability calculated in Step S103, Step S104 calculates a temporal blending rate.

Based on the temporal blending rate calculated in Step S104, Step S105 temporally blends the pixel value inputted in Step S101 with the pixel value after the spatial blending in Step S202.

Step S106 outputs an output image on which the temporal blending is executed in Step S105.

Step S107 stores the output image in a buffer.

Step S108 determines whether or not all the pixels are processed. If all the pixels are processed, the processing on the one image ends (Step S109). If not all the pixels are processed, the sequence goes back to Step S101.

The above processing makes it possible perform noise removal filtering, by adoptively changing and optimizing the strength of temporal noise removal filtering and smoothly switching between the temporal noise removal filtering and the spatial noise removal filtering to be performed on a dynamic portion.

As described above, the image noise removing apparatus according to Embodiment 2 can estimate motion in the second image with great accuracy, spatially remove noise from the second image depending on the result of the motion estimation, and temporally remove noise from the second image. The great accuracy in motion estimation executed on the second image successfully improves accuracy in spatial noise removal. Then, temporal noise removal following the spatial noise removal can provide an image with more appropriate temporal noise removal filtering.

Furthermore, as the second image appears less likely to be dynamic, the second image can receive spatial noise removal filtering where the second image is weighted heavier. When a portion of the second image appears less likely to be dynamic, the second image is weighted heavier, so that a side effect such as blur occurring in the spatial noise removal can be prevented.

Figure 9:
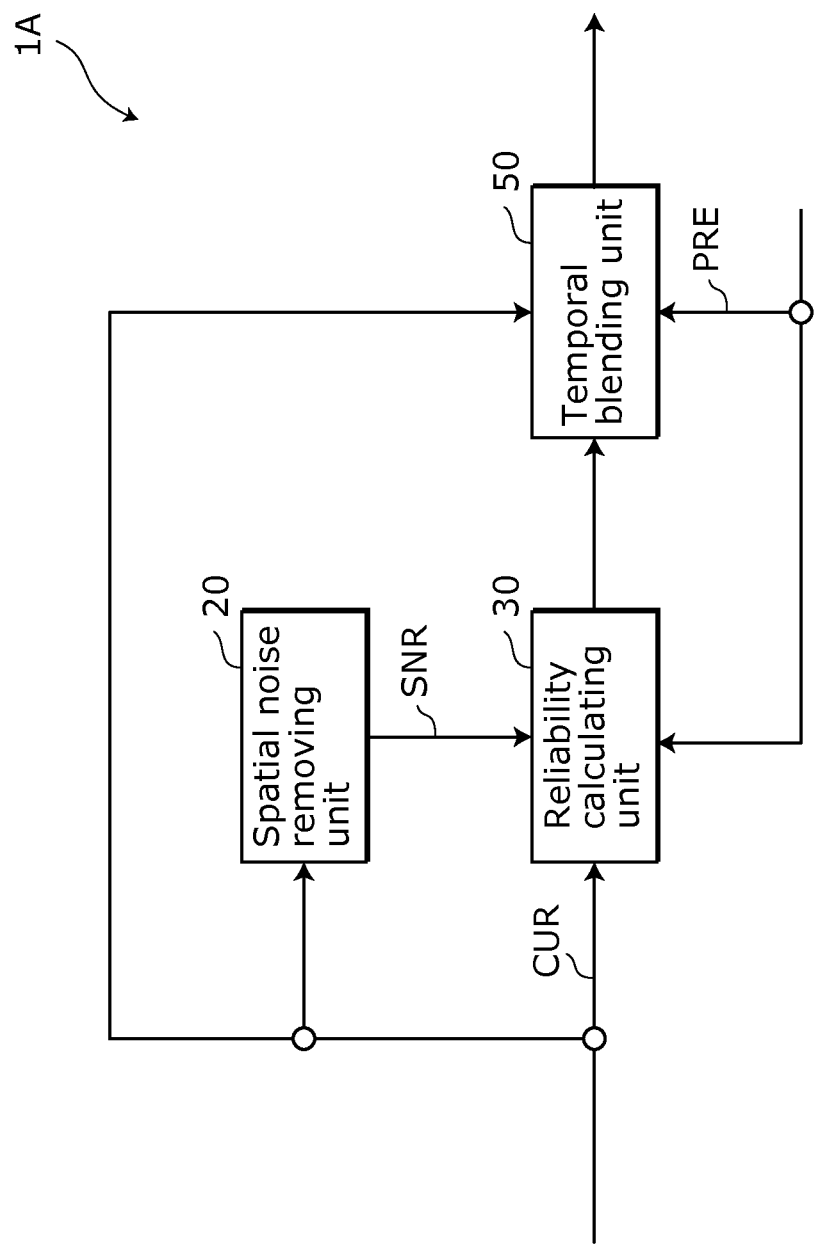
FIG. 9 illustrates an exemplary image noise removing apparatus according to each of the embodiments.

It is noted that the image noise removing apparatus according to each of Embodiments 1 and 2 may be implemented in the structure bellow. FIG. 9 illustrates an exemplary image noise removing apparatus according to each of the embodiments.

As illustrated in FIG. 9, an image noise removing apparatus 1A for removing noise, which is included in the second image that temporally succeeds the first image, includes the spatial noise removing unit 20, the reliability calculating unit 30, and the temporal blending unit 50.

The spatial noise removing unit 20 executes an operation for removing noise included in the second image (CUR) using a pixel value included in the second image (CUR), thereby generating a spatial noise-free image (SNR).

Based on the spatial noise-free image (SNR), the second image (CUR), and the first noise-free image (PRE) generated from the first image with noise removed, the reliability calculating unit 30 calculates a reliability indicating whether or not the second image (CUR) is dynamic.

The temporal blending unit 50 performs addition processing on the second image (CUR) and the first noise-free image (PRE), based on the reliability.

It is noted that, in the above embodiments, each of the constituent elements may be implemented in a form of dedicated hardware. The constituent elements may also be implemented through execution of a software program suitable to each constituent element. Each of the constituent elements may be implemented as a program executing unit, such as a CPU and a processor, which reads out and executes a software program recorded on a recording medium including a hard disc or a semiconductor memory. Here, the program below may be the software that works as the image noise removing apparatus according to each of the embodiments.

In other words, the program is an image noise removing method which removes, after removal of noise from a first image, noise included in a second image. The program causes a computer to execute the image noise removing method including: executing an operation for removing the noise included in the second image using a pixel value included in the second image, thereby generating a spatial noise-free image; calculating a reliability indicating how dynamic the second image is, based on the spatial noise-free image, the second image, and a first noise-free image which is generated from the first image with the noise therein removed; and performing, based on the reliability, a weighted summation on the second image and the first noise-free image, thereby removing the noise included in the second image.

Although only some exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention.

A technique employed for an image noise removing apparatus according to the present invention can adoptively change the strength of temporal noise removal filtering, which is effective in removing noise from video sequences captured by digital video cameras and digital still cameras.

[Reference Signs List]

1, 1A, and 2 Image noise removing apparatus
10 Input image terminal
20 Spatial noise removing unit
30 Reliability calculating unit
31a, 31b, and 31c Difference operating unit
32 Probability calculating unit
40 Temporal blending-rate calculating unit
50 Temporal blending unit
60 Buffer
70 Output image terminal
80 Spatial blending-rate calculating unit
90 Spatial blending unit

The invention claimed is:

1. An image noise removing apparatus which removes, after removal of noise from a first image, noise included in a second image, the image noise removing apparatus comprising:
  a non-transitory memory storing a program; and
  a hardware processor that executes the program and causes the image noise removing apparatus to operates as:
    a spatial noise removing unit configured to execute an operation for removing the noise included in the second image using a pixel value included in the second image, thereby generating a spatial noise-free image;
    a reliability calculating unit configured to calculate a reliability indicating how dynamic the second image is, based on the spatial noise-free image, the second image, and a first noise-free image which is generated from the first image with the noise therein removed; and
    a temporal blending unit configured to perform, based on the reliability, a weighted summation on the second image and the first noise-free image, thereby removing the noise included in the second image,
  wherein the reliability calculating unit is configured to calculate the reliability to be greater as a pixel included in the second image is less dynamic, and as the weighted summation, the temporal blending unit is configured to weigh the first noise-free image heavier as the reliability is greater, and wherein the pixel value includes elements, and the reliability calculating unit is configured to calculate the reliability to be greater as an angle formed between a first vector and a second vector is narrower, the first vector having, as an element, a difference between a pixel value of a pixel included in the spatial noise-free image and a pixel value of a co-located pixel in the second image, and the second vector having, as an element, a difference between a pixel value of a pixel included in the first noise-free image and a pixel value of a co-located pixel included in the second image.

2. The image noise removing apparatus according to claim 1, wherein the reliability calculating unit is configured to calculate the reliability to be greater as a difference is smaller between a pixel value of a pixel included in the first noise-free image and a pixel value of a co-located pixel included in the second image.

3. The image noise removing apparatus according to claim 2, wherein the reliability calculating unit is configured to calculate the reliability based on a ratio of the difference to a predetermined deviation in distribution of pixel values which changes due to noise.

4. The image noise removing apparatus according to claim 1, wherein the reliability calculating unit is configured to calculate the reliability to be greater as a difference is smaller between a pixel value of a pixel included in the first noise-free image and a pixel value of a co-located pixel included in the spatial noise-free image.

5. The image noise removing apparatus according to claim 1, wherein the first image is one of images included in a video sequence, and the second image is one of the images included in the video sequence, and is located immediately after the first image in order of time.

6. The image noise removing apparatus according to claim 1, further comprising a spatial blending unit configured to perform, based on the reliability, a weighted summation on the second image and the spatial noise-free image, thereby generating a spatially blended image, wherein the temporal blending unit is further configured to perform, based on the reliability, the weighted summation on the spatially blended image and the first noise-free image, thereby removing the noise included in the second image, the first noise-free image being generated from the first image with the noise therein removed.

7. The image noise removing apparatus according to claim 6, wherein the reliability calculating unit is configured to calculate the reliability to be greater as a pixel included in the second image is less dynamic, as the weighted summation, the spatial blending unit is configured to weigh the second image heavier as the reliability is greater, and as the weighed summation, the temporal blending unit is configured to weigh the first noise-free image heavier as the reliability is greater.

8. The image noise removing apparatus according to claim 1, wherein the first noise-free image is generated from the first image with the noise therein removed by the image noise removing apparatus.

9. An image noise removing method for an image noise removing apparatus for removing, after removal of noise from a first image, noise included in a second image, the image noise removing apparatus including a non-transitory memory storing a program, and a hardware processor that executes the program and causes the image noise removing apparatus to perform the image noise removing method comprising:

executing an operation for removing the noise included in the second image using a pixel value included in the second image, thereby generating a spatial noise-free image;

calculating a reliability indicating how dynamic the second image is, based on the spatial noise-free image, the second image, and a first noise-free image which is generated from the first image with the noise therein removed; and performing, based on the reliability, a weighted summation on the second image and the first noise-free image, thereby removing the noise included in the second image, wherein the calculating of the reliability calculates the reliability to be greater as a pixel included in the second image is less dynamic, and as the weighted summation, the weighted summation weighs the first noise-free image heavier as the reliability is greater, and wherein the pixel value includes elements, and the calculating of the reliability calculates the reliability to be greater as an angle formed between a first vector and a second vector is narrower, the first vector having, as an element, a difference between a pixel value of a pixel included in the spatial noise-free image and a pixel value of a co-located pixel in the second image, and the second vector having, as an element, a difference between a pixel value of a pixel included in the first noise-free image and a pixel value of a co-located pixel included in the second image.

10. A non-transitory computer-readable recording medium having a computer program recorded thereon, the computer program causing a computer to execute the image noise removing method according to claim 9.

11. An integrated circuit which removes, after removal of noise from a first image, noise included in a second image, the integrated circuit comprising:

a non-transitory memory storing a program; and a hardware processor that executes the program and causes the integrated circuit to operates as:

a spatial noise removing unit configured to execute an operation for removing the noise included in the second image using a pixel value included in the second image, thereby generating a spatial noise-free image;

a reliability calculating unit configured to calculate a reliability indicating how dynamic the second image is, based on the spatial noise-free image, the second image, and a first noise-free image which is generated from the first image with the noise therein removed; and a temporal blending unit configured to perform, based on the reliability, a weighted summation on the second image and the first noise-free image, thereby removing the noise included in the second image, wherein the reliability calculating unit is configured to calculate the reliability to be greater as a pixel included in the second image is less dynamic, and as the weighted summation, the temporal blending unit is configured to weigh the first noise-free image heavier as the reliability is greater, and wherein the pixel value includes elements, and the reliability calculating unit is configured to calculate the reliability to be greater as an angle formed between a first vector and a second vector is narrower, the first vector having, as an element, a difference between a pixel value of a pixel included in the spatial noise-free image and a pixel value of a co-located pixel in the second image, and the second vector having, as an element, a difference between a pixel value of a pixel included in the first noise-free image and a pixel value of a co-located pixel included in the second image.

* * * * *